UNITED STATES PATENT OFFICE.

ERICH EBLER, OF HEIDELBERG, GERMANY.

METHOD OF TREATING RADIO-ACTIVE ORES AND INTERMEDIATE PRODUCTS.

1,142,154.        Specification of Letters Patent.     Patented June 8, 1915.

No Drawing.      Application filed December 8, 1913. Serial No. 805,407.

*To all whom it may concern:*

Be it known that I, Dr. ERICH EBLER, a citizen of the German Empire, residing at Heidelberg, Baden, Germany, have invented certain new and useful Improvements in Methods of Treating Radio-Active Ores and Intermediate Products, of which the following is a specification.

The present invention relates to a method of treating radioactive ores and intermediate products, in particular raw sulfates, silicates, phosphates and other salts of radium and mesothorium, and consists in treating the materials with reducing agents and thereafter extracting with solvents for the radioactive salts formed by the reducing process. According to the invention the reducing process is preferably effected by means of reducing agents which allow of a conversion without external heating by merely starting the reaction process by means of an igniting medium. Such reducing agents are in particular calcium hydrid ($CaH_2$) and metallic calcium, aluminium and magnesium. These reducing agents may be used either alone or in combination with each other or with other reducing agents which would require external heating if used alone for the reduction process. The combined use of reducing agents of the first mentioned kind and of the second kind may be, and especially in the case of calcium hydrid is, advantageous as the process is made less expensive. This will become clear if it is taken into consideration that the price of calcium carbid which is an excellent reducing agent for readioactive ores, etc., is only about $\frac{1}{12}$ of the price of calcium hydrid. In order to allow the use of a comparatively large proportion of calcium carbid or other cheap reducing agents such as coal in the reduction mixture other reagents in small quantities up to about 10% may be added such as sulfates, for instance sulfate of aluminium, which have the property of reacting with calcium hydrid with development of heat. The more heat developed by reducing agents such as calcium hydrid alone or in mixture with sulfate of aluminium, the more of the cheap calcium carbid, coal, etc., may be used in the reaction mixture. The calcium carbid forms also for itself if used alone a very valuable reducing agent for "raw sulfates" of radium and mesothorium. The high reducing effect of this substance possibly depends on a decomposition of the calcium carbid to calcium and carbon, the calcium vapor penetrating the whole mass and securing complete reduction. If calcium carbid is used alone as reducing agent then it is advisable to use the carbid in such quantity that its contents in calcium is sufficient to effect complete reduction, therefore for each $SO_4$ radical four molecules $C_2Ca$ are taken. The calcium hydrid is particularly suited as a reducing agent, when the materials to be reduced are sulfates. The calcium hydrid is employed dry, in a fine pulverulent form, and is added in such quantity to the likewise pulverized sulfates, that to every molecule of sulfate there are four molecules of calcium hydrid. Such mixture may be ignited in the manner known in aluminothermy by means of an igniting mixture and a magnesium band. During the reduction the calcium hydrid acts in such a manner on the raw sulfate, that the hydrogen is liberated in its elementary condition, thus the reactions proceed as shown by the general formula:

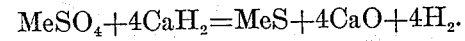

$$MeSO_4 + 4CaH_2 = MeS + 4CaO + 4H_2.$$

This behavior of the reaction mixtures affords in practice two advantages: 1. The hydrogen produced by the reaction loosens the reaction mixture to such an extent that at the end of the reaction it is in a pulverulent or at least very easily pulverized loose condition. 2. The hydrogen produced by the reaction, which is burnt only outside of the reaction mixture, protects the sulfid formed during the period of the maximum temperature against being oxidized.

Metallic calcium, aluminium, magnesium may be employed with advantage, when the radioactive ores and the like are employed in form of phosphates, silicates or the like. In this case the not readily soluble phosphates, silicates and the like are converted into phosphids or silicids and the like, which are more easily soluble in diluted acid. This is particularly valuable in treating ores of thorium. It further affords the advantage, that the greater part of the phosphorus escapes in form of phosphorus-hydrogen compounds, whereby in treating thorium ores the particularly difficult complete freezing of the thorium from phosphoric acid is greatly facilitated.

From the phosphoreted hydrogen compounds escaping in form of gas valuable phosphorus compounds may be recovered in known manner. Furthermore it is possible by suitable selection of the metal mixtures to be used in the autogenous reduction, to obtain the reduction to silicids (calcium or magnesium silicids) of a considerable part of the quartz sand mixed with the monazite. In the treatment with water and acid, following the initial treatment, a corresponding part of the silicium escapes in form of hydrogen silicid.

As the reaction between the phosphates and silicates on the one hand, and the calcium, magnesium and aluminium on the other hand is very violent, it is preferable to dampen it by an addition of some calcium hydrid. As a result, by the constant production of hydrogen from the calcium hydrid, a reoxidization of the phosphids, or silicids obtained is avoided.

When the reaction between the radioactive ores, etc., and the reducing agents is finished and the mass thereafter cooled down, it is extracted and transformed into so-called "raw chlorids" which contain substantially all of the radium and of the mesothorium of the ores, etc., originally treated and besides chlorids of iron, magnesium, strontium, calcium. In order to obtain from these raw chlorids the pure salts in enriched form, according to a further part of this invention the aqueous solutions of the raw chlorids are saturated with hydrochloric acid gas under simultaneous cooling. By such treatment only the radium-, barium- and mesothorium-chlorid is precipitated. The hydrochloric acid gas treatment may be replaced by a treatment with concentrated nitric acid with the analogous effect that only the radium, barium and mesothorium are precipitated, of course, however, in the form of nitrates. After settling of the precipitates the liquid may be separated from the precipitate by filtration. The precipitate contains the whole of the radioactive metal of the raw chlorid solution. In the case of the hydrochloric acid gas precipitation of the radium, the liquid separated off from the precipitate may be used for regenerating hydrochloric gas for treating a further portion of raw chlorids. The precipitation of the radium salt takes place quicker than that of the barium salt so that for instance 98% of the radium is precipitated when the precipitate contains only 80% of the barium. It is, therefore, possible to produce a product which is comparatively rich in radium by interrupting the precipitating process before it is completely finished.

The precipitation of the radium in the raw chlorid solution saturated with hydrochloric acid gas takes place far below the point where the solution is saturated with radium salt. This effect is surprising, since the content of the raw chlorid solution in radium is very low and only amounts to, say, 1/10000% of $RaCl_2$. This precipitating process is entirely different from the precipitation of radium chlorid from solutions of high concentration where the introduction of hydrochloric acid gas produces oversaturation in radium. In the precipitating process here in question it may be assumed that the $RaCl_2$ is absorbed by the $BaCl_2$ which is always present in considerable quantity in raw chlorid solutions. The primary reaction is probably the precipitation of the barium chlorid, the radium precipitation being due to a supplementary reaction depending upon the precipitation of the barium chlorid. Any calcium salt present in the solution remains at the same time dissolved; so that the precipitating process is at the same time a fractionating or purifying process of high practical value.

The following examples show how to proceed in order to practically carry out the invention:

Example 1: 20 kilograms of dry and finely pulverized "crude sulfates" from carnotite, which contained 66% barium sulfate, $7.1 \times 10^{-5}\%$ radium sulfate (corresponding to $5.0 \times 10^{-5}\%$ radium—the element), 19% calcium sulfate, 2% iron sulfate, 5% lead sulfate and 5% silicon, are mixed completely dry with 20 kilograms of finely pulverized calcium hydrid (of a content of about 80% $CaH_2$) (corresponding approximately to 1 molecule of the sulfates in the "crude sulfates" to every 4 molecules $CaH_2$). The mixture is tightly packed into a crucible of refractory material and then ignited by a small quantity (introduced in a passage about as thick as a finger in the axis of the crucible into the mixture of crude sulfate and calcium hydrid) of "igniting mixture" of known composition (40 parts $BaO_2$, 7 parts $KClO_3$, 10 parts of Al-dust) by means of a piece of magnesium band stuck into the igniting mixture. The reduction of the sulfates proceeds within a few seconds in a brief, but extremely violent reaction. After the contents of the crucible has been cooled, the mass is rubbed to a fine powder, mixed with water to a paste, and this paste is then in portion and with continuous stirring added to about 200 kilograms of 20% hydrochloric acid free from sulfuric acid at boiling point and boiled until all smell of sulfurated hydrogen has disappeared. The liquid which still reacts alkaline is then acidulated with 1/1-normal hydrochloric acid free from sulfuric acid, filtered hot and the residues are exhausted with 1/1-normal hydrochloric acid. The combined extracts are concentrated, whereby a large quantity of pure radium-barium-chlorid crystallizes out. The lyes of this first crystallization produce on being saturated with gaseous hydric chlorid a further quantity of pure radium-barium-chlorid. Altogether about 11 to 12 kilograms of radium-barium-chlorid are recovered, which contain 10 milligrams of radium (the element); this is over 90% of the quantity of radium contained in the initial material.

Example 2: 20 kilograms of dry finely pulverized radium sulfateous residues from vanadinic autunite, which remained after the vanadium extraction and contained 37% barium sulfate, $5.6 \times 10^{-6}$% radium sulfate (corresponding to $3.3 \times 10^{-6}$% radium—the element), 2% lead sulfate, 22% silicon besides iron, calcium, magnesium and still 1.3% $V_2O_5$, are intimately mixed fully dry with about 12 kilograms of finely pulverized calcium hydrid (of a content of about 80% $CaH_2$) (a little more than 4 molecules $CaH_2$ to one molecule of the sulfates contained in the initial material). The mixture is ignited and the reaction mass is finely pulverized after cooling and stirred with water to a paste and introduced into about 100 kilograms of 20% hydrochloric acid free of sulfuric acid at boiling heat in portions, and the residue is exhaustively extracted with 1/1-normal hydrochloric acid free from sulfuric acid. The combined extracts are then saturated with hydrochloric acid whereby about 6 kilograms of pure radium-barium-chlorid are obtained, which contain 0.6 milligram of radium, corresponding to over 90% of the radium contained in the initial material.

Example 3: 1 part of monazite sand (from Bahia) is intimately mixed with ½ part of magnesium powder and 1/100 part of pulverized calcium hydrid and the mixture is then tightly packed into a crucible of refractory material. The mixture is then ignited by a small quantity (introduced into a passage as thick as a finger in the axis of the crucible into the mixture) of "igniting mixture" of known composition (40 parts $BaO_2$, 7 parts $KClO_3$, 10 parts Al-dust) by means of a small piece of magnesium band introduced into the igniting mixture. The reduction of the phosphates proceeds in a few minutes in a brief, but extremely violent reaction. After cooling the finely pulverized mass is extracted with water and then exhaustively with hydrochloric acid under addition of sulfuric acid while hot, and lastly the liquid is separated from the residue, for instance by filtering. The thorium contained in the liquid is separated from the residue, for instance by filtering. The thorium contained in the liquid is separated therefrom after the known process, for instance by means of thio-sulfate. The radium and the mesothorium remaining in the residue as sulfates are recovered therefrom by the known processes.

Example 4: 100 kilograms radium sulfateous residues from vanadinic autunite which remained after the vanadium extraction and contained 37% barium sulfate, $5.6 \times 10^{-6}$% radium sulfate, 2% lead sulfate, 22% silicon, besides iron, strontium, calcium, magnesium and still 0.3% vanadium are intimately mixed with 50 kilograms of finely powdered calcium carbid and heated in a covered crucible to bright red heat for 2 to 3 hours. After cooling the mass is stirred with water to a paste and exhaustively extracted at high temperature with 1/1 normal hydrochloric acid. There results a weak hydrochloric solution of radium-barium-chlorid which is free of lead but still contains iron, strontium, calcium, magnesium and small portions of silicon. The solution is then concentrated by evaporating and thereafter saturated under cooling and stirring with hydrochloric acid gas. After separating off the strong hydrochloric acid liquid (which can be used for producing fresh hydrochloric acid gas), pure white radium-barium-chlorid is obtain in a quantity of about 33 kilograms which contain $2.9 \times 10^{-3}$% grams of radium corresponding to about 90% of the radium contained in the initial material.

Example 5: 50 grams radium-barium-chlorid which contain besides small portions of impurities 99% barium-chlorid and $2.4 \times 10^{-3}$% radium (element), are dissolved in water so as to form a solution as concentrated as possible. Into this solution hydrochloric gas is introduced under cooling and stirring without taking care to completely saturate the solution. The precipitate is separated from the liquid by sucking the liquid through a filter of asbestos, then washed in the cold with about 10/1-normal hydrochloric acid and dried. 45 grams pure radium-barium-chlorid are obtained which contain $1.19 \times 10^{-3}$ grams radium (element). The final radium-barium-chlorid therefore contains 90% of the barium and 99% of the radium of the initial material so that the final product contains a greater percentage of radium (compared with barium) than the initial material.

What I claim is:
1. The process of treating mixtures containing radioactive substances (radium, mesothorium, thorium, etc.), which consists in subjecting the same to the action of a reducing agent adapted to react after igniting without external heating.

2. The process of treating mixtures containing radioactive substances (radium, mesothorium, thorium, etc.), which consists in subjecting the same to the action of a calcium-containing reducing agent.

3. The process of treating mixtures containing radioactive substances (radium, mesothorium, thorium, etc.), which consists in subjecting the same to the action of calcium hydrid.

4. The process of treating mixtures containing radioactive substances (radium, mesothorium, thorium, etc.), which consists in subjecting the same to the action of calcium hydrid and reducing agents requiring external heating for reaction.

5. The process of treating mixtures containing radioactive substances (radium, mesothorium, thorium, etc.), which consists in subjecting the same to the action of calcium hydrid and calcium carbid.

6. A process of treating radioactive sulfates with reducing agents consisting in mixing pulverized radioactive sulfate with pulverized calcium hydrid containing reducing material, igniting the mixture and leaving the ignited mass for reaction.

7. A process of treating radioactive sulfates with reducing agents consisting in mixing pulverized radioactive sulfate with pulverized calcium hydrid and calcium carbid containing reducing material, igniting the mixture, and leaving the ignited mass for reaction.

8. A process of treating mixtures containing radioactive substances consisting in mixing same with reducing agents and with substances adapted to react with said reducing agents under development of heat, and bringing the mixture to reaction.

9. A process of treating mixtures containing radioactive substances consisting in mixing same with reducing material containing calcium hydrid and sulfate of aluminium, and bringing the mixture to reaction.

10. A process of treating mixtures containing radioactive substances consisting in mixing same with reducing material containing calcium hydrid, sulfate or aluminium and calcium carbid, and bringing the mixture to reaction.

11. The process of treating mixtures containing radioactive substances consisting in bringing the radioactive substances to reaction with reducing agents, treating the reaction products with hydrochloric acid solution so as to form raw chlorids, introducing acid into said solution adapted to precipitate the contents of the solution in radioactive material, and separating the precipitate from the solution.

12. Process of obtaining purified radioactive salts from raw chlorids consisting in introducing hydrochloric acid gas into the raw chlorid solution and separating the precipitate from the solution.

13. Process of obtaining purified radioactive salts from raw chlorids, consisting in introducing hydrochloric acid gas into the raw chlorid solution, interrupting the introduction of the hydrochloric acid gas before complete saturation, and separating the precipitate from the solution.

In testimony whereof I affix my signature in presence of two witnesses.

Dr. ERICH EBLER.

Witnesses:
 Fritz Hess,
 S. S. Berger.

Copies of this patent may be obtained for five cents each, by addressing the "Commissioner of Patents, Washington, D. C."